(12) United States Patent
Lim et al.

(10) Patent No.: US 9,563,766 B2
(45) Date of Patent: Feb. 7, 2017

(54) DEVICE AND ACCESSORY PAIRING

(71) Applicants: Cheow Guan Lim, Singapore (SG);
Robert P. Rozario, San Jose, CA (US)

(72) Inventors: Cheow Guan Lim, Singapore (SG);
Robert P. Rozario, San Jose, CA (US)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 14/266,691

(22) Filed: Apr. 30, 2014

(65) Prior Publication Data
US 2015/0317473 A1 Nov. 5, 2015

(51) Int. Cl.
G06F 21/00 (2013.01)
G06F 21/44 (2013.01)

(52) U.S. Cl.
CPC ........... *G06F 21/445* (2013.01); *G06F 21/44* (2013.01); *G06F 2221/2129* (2013.01)

(58) Field of Classification Search
USPC ...................................................... 726/16
See application file for complete search history.

(56) References Cited

U.S. PATENT DOCUMENTS

| 8,633,801 | B2* | 1/2014 | Iwai ..................... G06F 1/26 320/106 |
| 2011/0093714 | A1* | 4/2011 | Schaecher et al. ........... 713/176 |
| 2011/0125601 | A1* | 5/2011 | Carpenter et al. ........... 705/26.1 |
| 2011/0167262 | A1* | 7/2011 | Ross et al. .................... 713/168 |
| 2012/0242459 | A1* | 9/2012 | Lambert ............. H04W 12/06 340/10.3 |
| 2013/0095757 | A1* | 4/2013 | Abdelsamie .......... H04W 4/001 455/41.1 |
| 2014/0196142 | A1* | 7/2014 | Louboutin et al. ............ 726/16 |

OTHER PUBLICATIONS

"Ferreting out the fakes in the chip supply chain," EE Times Special Report, retrieved from http://www.eetimes.com/document.asp?doc_id=1266971&orubt=yes on Apr. 30, 2014, 9 pp.

* cited by examiner

*Primary Examiner* — Joseph P Hirl
*Assistant Examiner* — Chi Nguy
(74) *Attorney, Agent, or Firm* — Shumaker & Sieffert, P.A.

(57) ABSTRACT

A device authenticates accessories by detecting that an accessory is attached to the device, determining a unique identification (ID) for the accessory, determining, based on the unique ID, if the accessory has been paired to the device, and in response to determining that the accessory has been paired to the device, enable use of the accessory by the device. In response to determining the accessory has not been paired to the device, the devices performs a secondary authentication process on the accessory.

17 Claims, 7 Drawing Sheets

DEVICE AND ACCESSORY PAIRING

TECHNICAL FIELD

The disclosure relates to electronics and, more particularly, to authenticating accessories for electronic devices.

BACKGROUND

Many types of electronic devices, including laptop computers, mobile phones, tablet computers, and other types of devices, rely on an array of accessories for performing certain functionality. As examples, electronic devices may utilize batteries for wireless power and utilize wired power supplies for charging the batteries and for providing wired power. It is common for a new device to be sold by an original equipment manufacturer (OEM) with a battery and a power supply. Over the course of a device's life, however, a user may wish to acquire additional accessories for the device. For example, a user may wish to purchase a second battery for travelling, or after several years of use, may wish to replace a battery that no longer sufficiently holds a charge. Users may also wish to keep power supplies at multiple locations or need power supplies with different plugs and voltages for different countries.

As the life cycles for accessories are often different than the life cycles of the devices themselves, there exists large demand for aftermarket accessories. Counterfeiters and other unauthorized manufacturers often attempt to capitalize on this aftermarket demand by selling unauthorized accessories, including counterfeit accessories and unauthorized refurbished accessories. These unauthorized accessories often times do not work properly and can even, in some instances, damage devices, potentially hurting an OEM's reputation.

SUMMARY

In general, this disclosure introduces a two-tiered approach to accessory authentication. As explained in greater detail below, original accessories sold with a new device may be paired with the device, while aftermarket accessories not sold with the device may utilize authentication hardware for validating the authenticity of aftermarket devices.

In one example, a method of authenticating an accessory includes, at a device, detecting that an accessory is attached to the device; determining a unique identification (ID) for the accessory; at the device, determining if the accessory has been paired to the device based on the unique ID; in response to determining the accessory has been paired to the device, enabling use of the accessory by the device.

In another example, a device includes one or more memories and one or more processors configured to detect that an accessory is attached to the device; determine a unique identification (ID) for the accessory; determine, based on the unique ID, if the accessory has been paired to the device; and, in response to determining that the accessory has been paired to the device, enable use of the accessory by the device.

In another example, a computer-readable storage medium stores instructions that when executed by one or more processors cause the one or more processors to detect that an accessory is attached to a device; determine a unique identification (ID) for the accessory; determining if the accessory has been paired to the device based on the unique ID; and, in response to determining the accessory has been paired to the device, enable use of the accessory by the device.

In another example, a device that can authenticate an accessory includes means for detecting that an accessory is attached to the device; means for determining a unique identification (ID) for the accessory; means for determining if the accessory has been paired to the device based on the unique ID; means for enabling use of the accessory by the device in response to determining the accessory has been paired to the device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
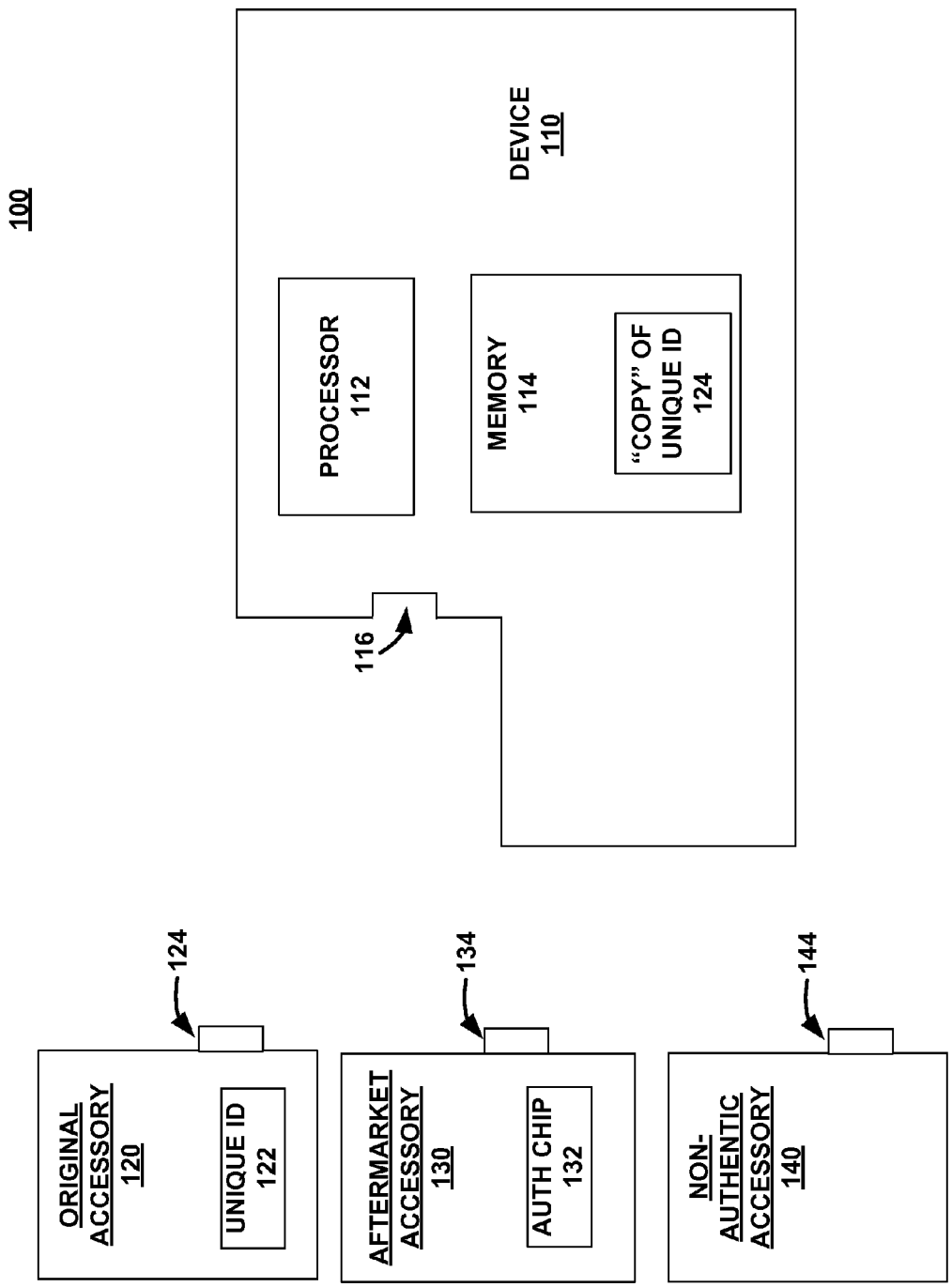
FIG. 1 shows an example of a system configured to implement the techniques of this disclosure.

This disclosure describes a two-tiered approach to accessory authentication. As explained in greater detail below, original accessories sold with a new device may be paired with the device, while aftermarket accessories not sold with the device may utilize authentication hardware for validating the authenticity of aftermarket devices.

Although the prevalence of counterfeit and other unauthorized accessories is well known to most original equipment manufacturers (OEMs), many OEMs cannot justify the initial, up-front investment in accessory-side, hardware authentication technology required to ensure accessories are genuine. Consumers are generally not willing to pay for such authentication technology because they expect a brand new accessory shipped in conjunction with a brand new device to be authentic. OEMs are likewise hesitant to pay for such authentication technology because they too know the brand new accessory is authentic, and it is likely many years before that accessory might end up in the secondary market, as an unauthorized refurbishment, for example.

This disclosure may implement a two-tiered authentication system for preventing or reducing the proliferation of unauthorized accessories. The first tier of authentication protection includes determining if an accessory has been paired to the device with which it is attempting to be used. The second tier of authentication protection includes utilizing accessory-side hardware to determine if the accessory is authentic. As will be explained in greater detail below, original accessories sold with a device may be paired to the device and may not need the authentication hardware, thus reducing the cost of the original accessories.

The techniques of this disclosure may enable an OEM to implement accessory authentication without having to invest in any additional hardware for the accessories that are packaged with a new device. According to the techniques of this disclosure, original accessories are paired with a device, such that upon boot up or upon installation of the accessory, the device may check to see if the accessory has previously been paired. If an accessory has previously been paired, then the device may enable use of the accessory without the need to determine if the accessory includes any sort of authentication hardware. If the accessory has not been previously paired with the device, then the device may attempt to determine if the accessory includes authentication hardware. If the device does not include any sort of authentication hardware, then the device may disable the accessory or otherwise prevent the accessory from being used. As will be explained in greater detail below, a device may be paired to an accessory by storing, at the device, a unique identifier for the accessory. Authentication of the original accessory may be performed by determining a unique identifier for the accessory and comparing it to unique identifiers stored by the device.

For aftermarket accessories, the device and accessory will hot have been paired. Thus, in order to authenticate aftermarket accessories, the device may perform a different type of authentication routine on the aftermarket accessory. The authentication routine may, for example, include detecting an authentication chip in the accessory to determine if the aftermarket accessory is authentic. The authentication chip may, for example, store encrypted information that the device can use to determine the authenticity of the aftermarket accessory. If an aftermarket accessory passes the authentication test, then the device may enable use of the accessory. If the aftermarket accessory fails the authentication test, then the device may disable the accessory or otherwise prevent the accessory from being used.

As used in this disclosure, the phrases original accessory or original accessories will generally be used to refer to those accessories that are included with a new device. The phrases aftermarket accessory and aftermarket accessories will generally be used to refer to those accessories that are acquired separately from the device.

According to the techniques of this disclosure, OEMs can ensure the authenticity of original accessories without including costly authentication hardware in the original accessories, thus potentially reducing the cost of original accessories. A device may be able to determine the authenticity of an original accessory by determining if the original accessory has been paired to the device. Should the original accessory become separated from the device to which it is paired, other devices will not authenticate the accessory because it will not be paired to those other devices and will not include the authentication hardware of an aftermarket accessory. Thus, should unauthorized distributors attempt to counterfeit or refurbish an original accessory, a device may not authenticate the counterfeit or unauthorized refurbished accessory. Moreover, a device may also not authenticate a stolen accessory, thus eliminating any potential benefit to be gained from the stealing.

FIG. 1 shows an example of a system 100 configured to implement the techniques of this disclosure. System 100 includes a device 110, original accessory 120, aftermarket accessory 130, and non-authentic accessory 140. Device 110 may, for example, be any of a laptop computer, a mobile phone or smartphone, a tablet computer, an e-reader, a portable music or video player, a camera or camcorder, a positioning system, a video gaming system, or virtually any other type of electronic device that utilizes external accessories. Device 110 includes processor 112, memory 114, and port 116. Depending on its type, device 110 may also include additional components not shown in FIG. 1.

Processor 110 may implement functionality and/or execute instructions within device 110. Processor 110 is generally intended to represent all processing capabilities of device 110. It is contemplated that in some implementations, the processing capabilities of device 110 may actually be distributed across multiple processing elements. In this regard, processor 110 is intended to represent one or more of digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules, and the techniques may be fully implemented in one or more circuits or logic elements.

Memory 114 within device 110 may store information for processing during operation of device 110. Memory 110 may include temporary memory that is not for long-term storage. Such temporary memory may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Memory 114 may also include one or more computer-readable storage media. Such computer-readable storage media may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Memory 114 may also store program instructions for execution by processor 112. Memory 114 in device 110 is generally intended to represent all the memory that may be contained in device 110, including, for example, caches, RAM, and storage media. In this regard, memory 114 may include multiple, different types of memory.

Original accessory 120 is an accessory that is, for example, sold new with device 110. Original accessory 120 may, for example, be a battery, a charging device, a wall power supply, a car power supply, an external speaker, an external camera, a storage device, a printing device, a docking device, an input device, an output device, a storage device, or virtually any other type of accessory that is compatible with device 110. Original accessory 120 includes a unique ID 122 and connector 124. Depending on its type, original accessory 120 may also include additional components not shown in FIG. 1.

As will be explained in greater detail below, as part of pairing device 110 and original accessory 120, device 110 may store a copy of unique ID 122 (shown as "copy" of unique ID 124 in FIG. 1) in memory 114. Device 110 may, for example, store unique ID 124 in a non-volatile ROM (e.g. EPROM or EEPROM) on a motherboard of device 110, for example, in conjunction with BIOS software. Although unique ID 124 may be stored in any type of memory, it is generally contemplated that unique ID 124 may be stored in a type of memory or memory location that is not accessible, or not easily accessible, by an end user. Although FIG. 1 shows only one original accessory (i.e. original accessory 120), device 110 may, in some examples, be paired with more than one original accessory, in which case device 110 may store copies of the unique IDs for all the devices with which it is paired.

For ease of explanation this disclosure may refer to the data stored (e.g. unique ID 124) in device 110 as a "copy" of unique ID 122, but it should be understood that the data stored by device 110 need not necessarily be an exact copy of unique ID 122. It may, for example, be an encrypted version of unique ID 122, a value generated based on unique ID 122, or some other variation. In some examples, unique ID 124 may be a number generated based on a number stored at device 110 and unique ID 122. Thus, unique ID 124 may be different than unique ID 122, but as long as unique ID 122 is known (by reading it from original accessory 120, for example), then unique ID 124 may be generated for comparison purposes. In some examples, to potentially make it more difficult for a user to circumvent the pairing process, a certificate may be generated based on the unique ID of original accessory 120 and based on a unique ID of device 110. When trying to determine if an accessory has been paired device 110 may regenerate that certificate to determine if it matches the stored certificate.

Aftermarket accessory 130 is an accessory that is sold separately from device 110. Aftermarket accessory 130 may be sold by the manufacturer of device 110, but also, may be sold by a different manufacturer than the manufacturer of device 110. Aftermarket accessory 130, like original accessory 120, may be any of a battery, a charging device, a wall power supply, a car power supply, an external speaker, an external camera, a storage device, a printing device, a docking device, an input device, an output device, a storage device, or virtually any other type of accessory that is compatible with device 110. Aftermarket accessory 130 includes authentication chip 132 and connector 134. Depending on its type, original accessory 120 may also include additional components not shown in FIG. 1.

Aftermarket accessory includes authentication chip 132, which is generally intended to represent any sort of hardware-based authentication scheme. By hardware-based authentication scheme, this disclosure means any sort of authentication scheme that requires a unique piece of hardware installed on the accessory. Authentication chip 132 may, for example, be configured to implement symmetric or asymmetric key authentication. In some example, authentication chip 132 may be configured to implement asymmetric key authentication using elliptic curve cryptography (ECC). In other examples, authentication chip 132 may be configured to implement symmetric key authentication using Secure Hash Authentication (SHA). In order to implement authentication functionality, aftermarket accessory 130 and device 110 may be configured to exchange authentication information. The portion of the authentication scheme performed by device 110 may be software-based and performed, for example, by processor 112. Authentication chip 132 may, for example, be a chip from Infineon's ORIGA family of authentication chips.

Non-authentic accessory 140 is an accessory that is not sold new with device 110 and is not authorized by the manufacturer of device 110. In this regard, non-authentic accessory may represent a counterfeit accessory or may represent a once authentic accessory that has been refurbished without the approval of the manufacturer of device 110. Non-authentic accessory may also represent an original accessory that has been separated from the device with which it was originally sold, by theft for example. Non-authentic accessory 140 may have a similar form factor to original accessory 120 and aftermarket accessory 130, and may include a similar connection mechanism (e.g. connector 144) as original accessory 120 and aftermarket accessory 130. As will be explained in greater detail below, non-authentic accessory 140 does not include a unique ID stored by device 110 or an authentication chip, and therefore, upon being connected to device 110, device 110 may not enable use of non-authentic accessory 140.

Original accessory 120 is configured to attach to device 110. In the example of FIG. 1, connector 124 may be inserted into port 116 such that once attached, device 110 and original accessory 120 are electrically and communicatively coupled. Aftermarket accessory 130 is similarly configured to attach to device 110. In the example of FIG. 1, connector 134 may be inserted into port 116 such that once attached, device 110 and aftermarket accessory 130 are electrically and communicatively coupled. The connectors and port shown in FIG. 1 are merely one example of how original accessory 120 and aftermarket accessory 130 may attach to device 110. It is contemplated that other means of attaching may be used. Port 116 and connectors 124 and 134 may, for example, correspond to a universal serial bus (USB) interface, a micro-USB interface, a Lightning interface, a 30-pin interface, a Molex connector, an ATX connector, an I2C-compatible interface, or any other type of interface, including both standardized interfaces and proprietary interfaces.

Figure 2:
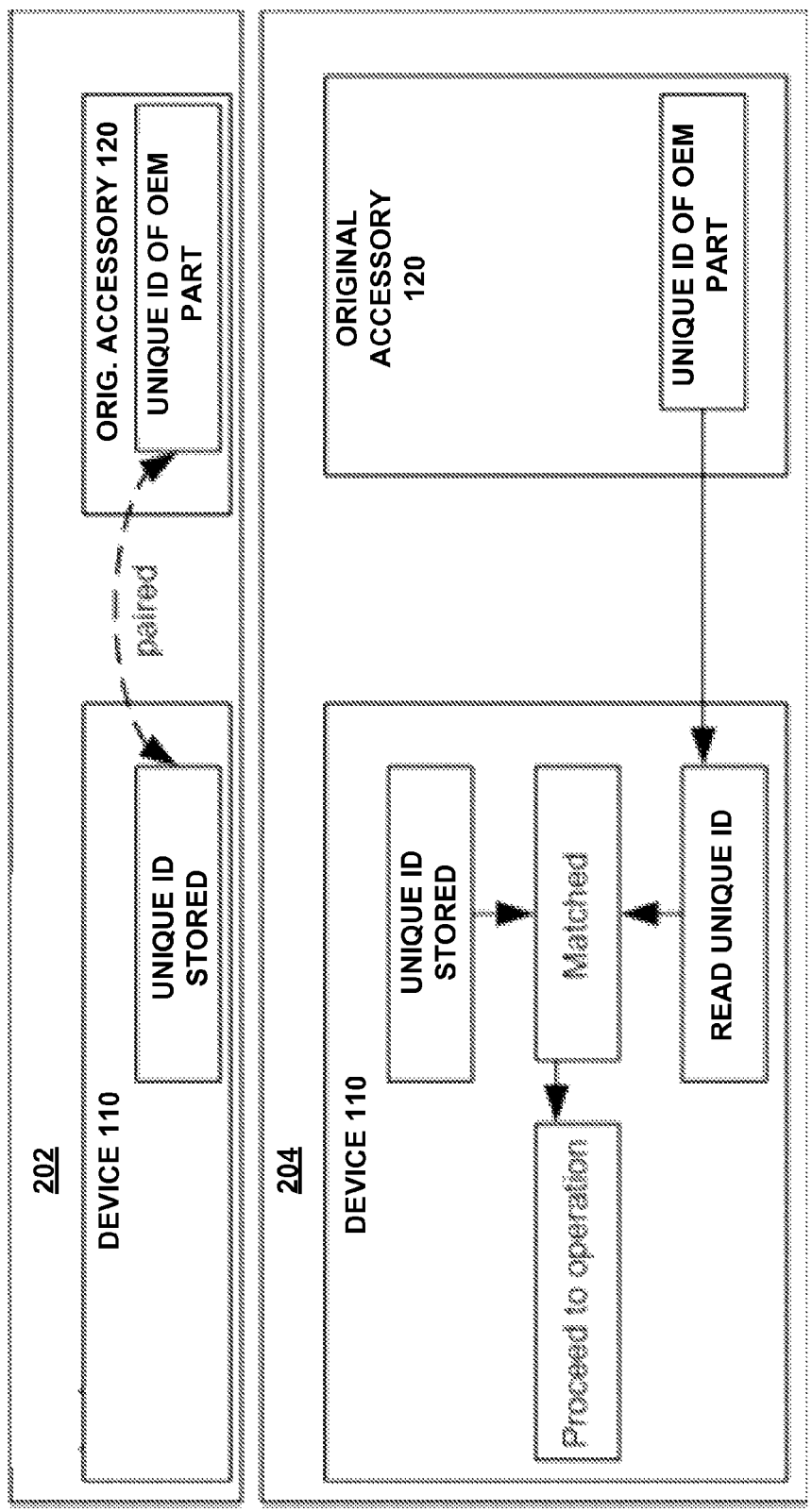
FIG. 2 shows an example of how a device and an original accessory may be configured to interact with one another.

FIG. 2 shows an example of how device 110 and original accessory 120 are configured to interact with one another. In the example of FIG. 2, device 110 is paired with original accessory 120. This pairing may, for example, be performed by an OEM prior to shipping device 110 and original accessory 120, be performed by a retailer prior to selling device 110 and original accessory 120, or may be performed by an end user upon an initial boot up of device 110. The pairing of device 110 and original accessory 120 may be performed at any point in the life cycle of device 110, but generally, this pairing may be performed very early in the life cycle of device 110, and this pairing may often be performed prior to the device being acquired by an end user.

The box in FIG. 2 labeled 202 shows one example of the pairing process between device 110 and original accessory 120. In the example of FIG. 2, original accessory 120 has an associated unique ID. The unique ID generally refers to any public, readable identifier of original accessory 120. The unique ID may, for example, be, or be based on, on a serial number of original accessory 120, a product identification number of original accessory 120, a message authentication code (MAC) of original accessory 120, a web domain certificate, or any other piece of readable, unique information. During the pairing process, a copy of the unique ID of original accessory 120 is stored in device 110. As explained above, in this context, "copy" should not be interpreted to necessarily mean an exact copy. Generally speaking, a maker of device 110 may implement the pairing process between device 110 and original accessory 120 in a variety of ways based on a unique ID of original accessory 120.

The pairing process may be performed by an OEM or by a retailer prior to device 110 and original accessory 120 being delivered to an end user. The pairing process may be done in a configuration mode that is inaccessible to the end user. Thus, only an authorized technician at the OEM or the retailer may perform the pairing, and end users may be restricted from altering the pairing. It is contemplated that the manner of pairing, and perhaps the fact that device 110 and original accessory 120 are paired at all, may be non-apparent to an end user. Only if the end user attempts to use original accessory 120 with another device may it become apparent that any sort of pairing between device 110 and original accessory 120 exists.

As explained above, the pairing process between device 110 and original accessory 120 may be performed by an OEM or retailer, such that device 110 and original accessory 120 are already paired once device 110 and original accessory 120 are acquired by an end user. The box in FIG. 2 labeled 204 shows one example of how device 110 and original accessory 120 may operate once under the control of the end user. Upon boot up of device 110 or upon connection of original accessory 120, device 110 may read the unique ID of original accessory 120. Device 110 may compare the read unique ID to the stored unique ID to see if they match. In some examples, the comparison may be performed by determining if the stored unique ID matches the unique ID read from original accessory 120. As indicated above, however, in some other examples, the stored unique ID may not be an exact copy of the unique ID of original accessory 120. Therefore, one or both of the stored unique ID and the read unique ID may undergo some sort of processing prior to the comparison. As original accessory 120 is an authorized accessory that has previously been paired with device 110, the unique ID read from original accessory 120 matches the stored unique ID, and device 110 proceeds to normal operation with original accessory 120.

In the example of FIG. 2, device 110 detects that original accessory 120 is attached to device 110. Device 110 determines a unique ID for original accessory 120 and determines if original accessory has been paired to device 110 based on the unique ID. In response to determining that original accessory 120 has been paired to device 110, device 110 enables use of original accessory 120. Device 110 may, for example, determine if original accessory 120 has been paired to device 110 by determining if the unique ID for original accessory 120 is stored on a memory of device 110.

Figure 3:
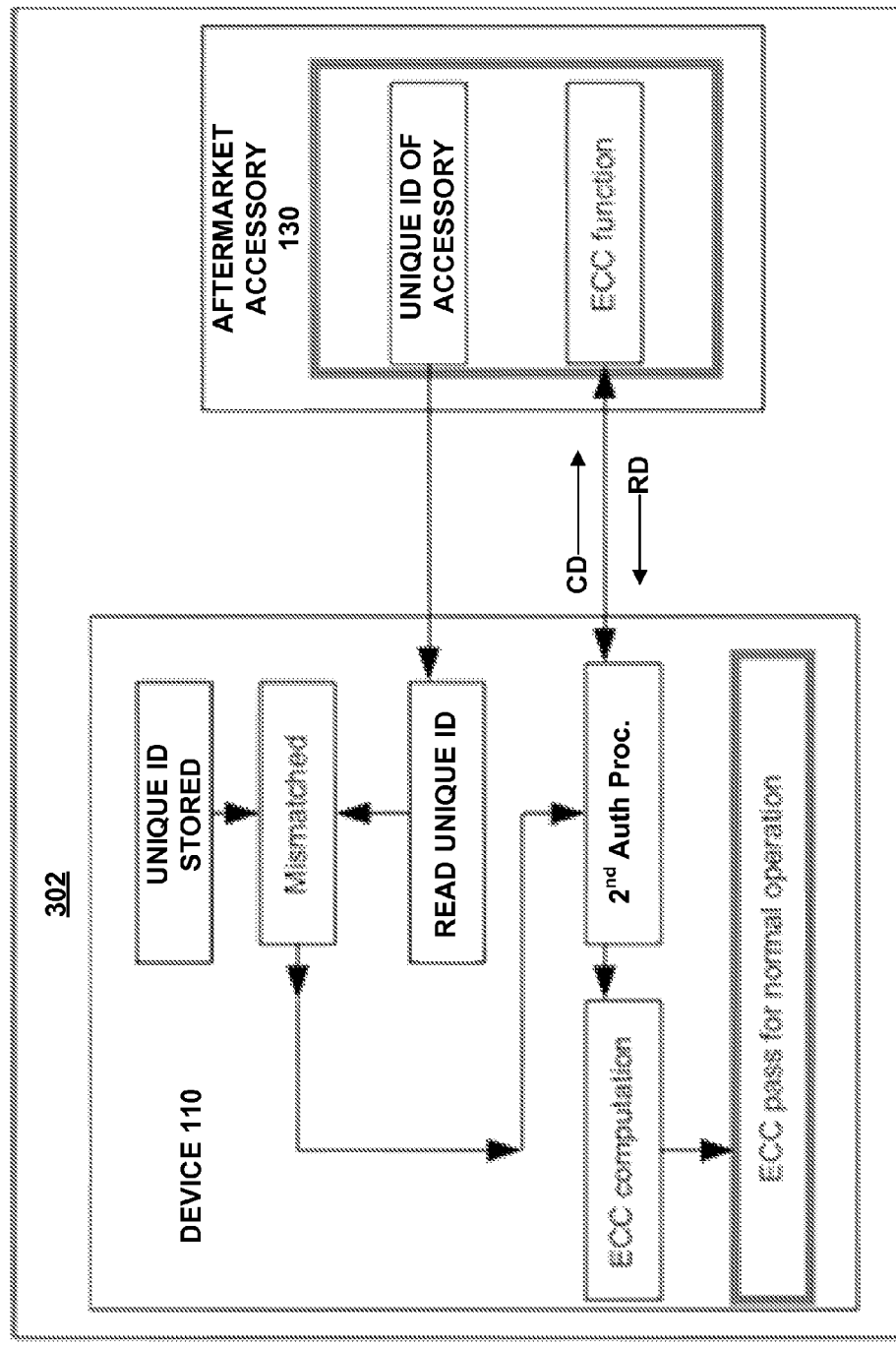
FIG. 3 shows an example of how a device and an aftermarket accessory may be configured to interact with one another.

FIG. 3 shows an example of how device 110 and aftermarket accessory 130 are configured to interact with one another. The box in FIG. 3 labeled 302 shows one example of how device 110 and aftermarket accessory 130 may operate once under the control of the end user. Upon installing aftermarket accessory 130, device 110 reads the unique ID of aftermarket accessory 130. Device 110 may have a stored unique ID, but the stored Cert ID may be different than the unique ID of aftermarket accessory 130. The stored unique ID may, for example, instead be the unique ID of original accessory 120. As the unique ID stored by device 110 does not match the unique ID read by device 110 from aftermarket accessory 120, device 110 may initiate a secondary authentication process.

As part of the secondary authentication process, device 110 may generate challenge data and send the challenge data to aftermarket accessory 130. Authentication chip 132 of aftermarket accessory 130 receives the challenge data, and using a cryptographic key, performs an authentication function on the challenge data ("CD" in FIG. 3) to generate response data. Device 110 likewise performs an authentication computation to generate a check value. The example of FIG. 3 shows device 110 and aftermarket accessory 130 implementing ECC authentication, although other types of authentication may also be used. The result of the authentication function performed by aftermarket accessory 130 is returned to device 110 as response data ("RD" in FIG. 3), and device 110 verifies the response data against the check value. As aftermarket accessory 130 is an authorized accessory with the proper authentication hardware, aftermarket accessory 130 passes the authentication check performed by device 110, and device 110 enables normal operation of aftermarket accessory 130. Thus, even though aftermarket accessory 130 is not paired with device 110, device 110 still enables normal operation for aftermarket accessory 130.

In the example of FIG. 3, in response to determining that aftermarket accessory 130 has not been paired to device 110, device 110 performs a secondary authentication process on aftermarket accessory 130. In response to aftermarket accessory 130 passing the secondary authentication process, device 110 enables use of aftermarket accessory 130. In this context, "passing" the secondary authentication process means the secondary authentication process confirms the authenticity of aftermarket accessory 130.

Figure 4:
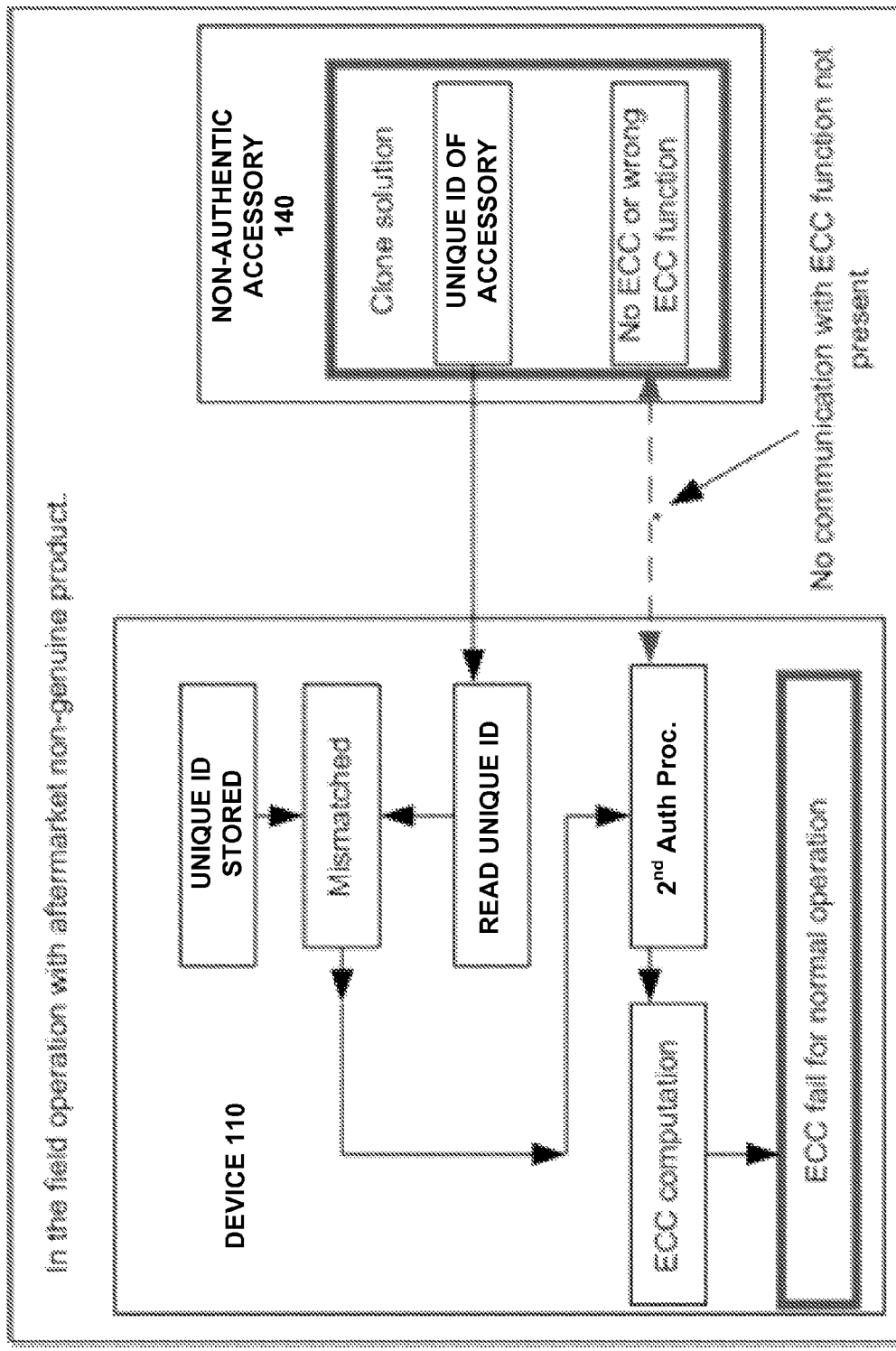
FIG. 4 shows an example of how a device and a non-authentic accessory may be configured to interact with one another.

FIG. 4 shows an example of how device 110 and non-authentic accessory 140 are configured to interact with one another. The box in FIG. 4 labeled 402 shows one example of how device 110 and non-authentic accessory 140 may operate once under the control of the end user. Upon installing non-authentic accessory 140, device 110 reads the unique ID of non-authentic accessory 140. Device 110 may have a stored unique ID, but the stored unique ID may be different than the unique ID of non-authentic accessory 140. The stored unique ID may, for example, instead be the unique ID of original accessory 120. As the unique ID stored by device 110 does not match the unique ID read by device 110 from non-authentic accessory 120, device 110 may initiate a secondary authentication process. As part of the secondary authentication process, device 110 may attempt to send challenge data to non-authentic accessory 140. As non-authentic accessory 140 is an unauthorized accessory without the proper authentication hardware, non-authentic accessory 140 fails the authentication check performed by device 110, and device 110 does not enable operation of non-authentic accessory 140. Non-authentic accessory 140 may, for example, fail the authentication check because it either does not include any authentication hardware or because the authentication hardware does not produce correct response data. Thus, because non-authentic accessory 140 is not paired with device 110 and lacks the proper authentication hardware, device 110 prevents normal operation for non-authentic accessory 140. As part of preventing normal operation, device 110 may enable only partial use of non-authentic accessory 140 or may enable no use of non-authentic accessory 140.

In the example of FIG. 4, in response to determining that non-authentic accessory 140 has not been paired to device 110, device 110 performs a secondary authentication process on non-authentic accessory 140. In response to the secondary authentication process not authenticating the accessory, device 110 prevents use of non-authentic accessory 140. In some instances, in response to the secondary authentication process not authenticating the accessory, device 110 may enable only partial use of the accessory. As one examples of partial use, device 110 may enable data transfer with the accessory but not receive power for charging from the accessory. While OEMs and system designers may have great flexibility in terms of how to implement partial use, it is generally contemplated that if partial use is enabled, device 110 may enable features of the accessory that do not potentially affect the safety of the user and/or device 110, while disabling features that do potentially affect the safety of the user and/or device 110.

Figure 5:
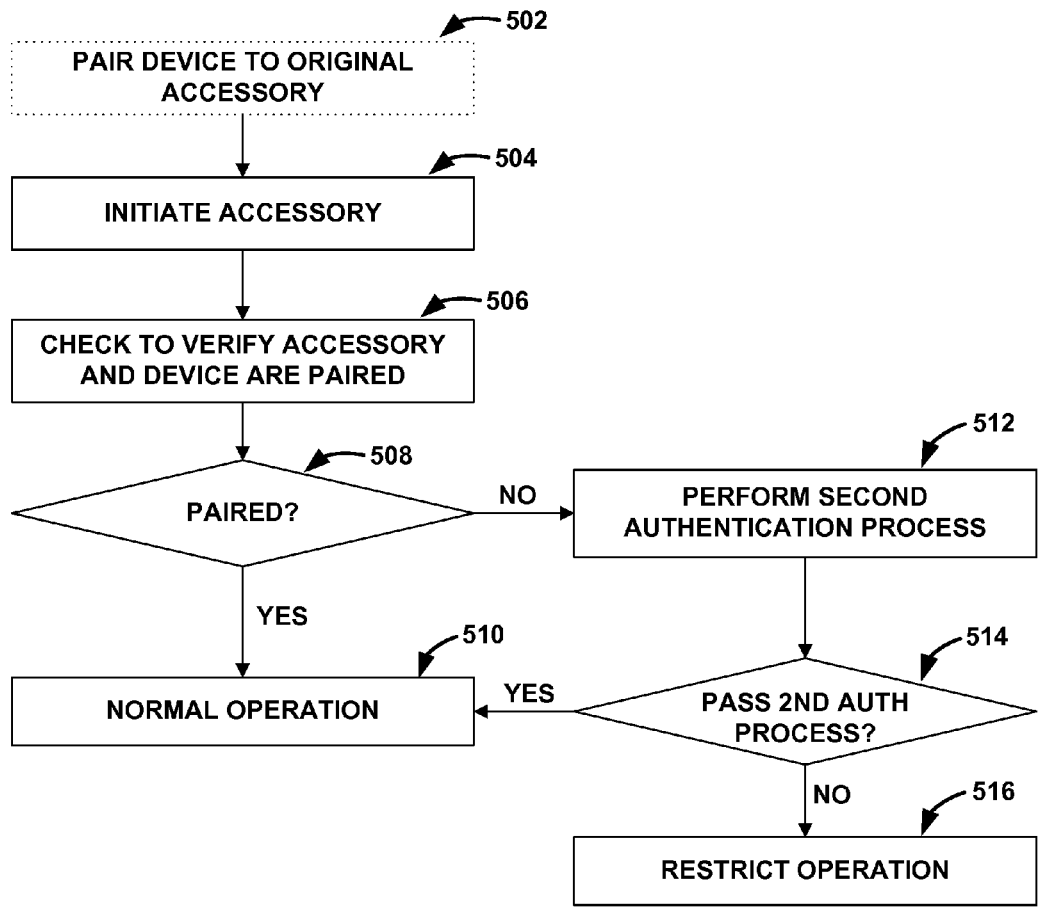
FIG. 5 is a flowchart illustrating an example process by which a device may authenticate an accessory according to the techniques of this disclosure.

FIG. 5 is a flowchart illustrating the process by which a device may authenticate an accessory according to the techniques of this disclosure. The techniques of FIG. 5 will be described with respect to device 110, original accessory 120, aftermarket accessory 130, and non-authentic accessory 140, although the techniques of FIG. 5 are not limited to any particular type of device. In the example of FIG. 5, device 110 is paired to original accessory 120 (502). As explained above, this pairing may be performed prior to device 110 and original accessory 120 being acquired by an end user. Device 110 may initiate an accessory (504). Device 110 may, for example, initiate the accessory upon boot up, upon the accessory being attached to device 110, or in response to some other event. Step 502 is shown in FIG. 5 with a dotted line to signify that it may, in some examples, only be performed one time. For example, pairing device 110 to original accessory 120 (e.g. step 502) may be performed once by an OEM or retailer, whereas initiating the accessory (e.g. step 504) may be performed many times. Step 504 may, for example, be performed every time device 110 is booted or restarted or every time an accessory is attached to device 110. As will be made clear in the following description, the accessory paired with device 110 in step 502 is original accessory 120, while the accessory initiated at step 504 may be any of original accessory 120, aftermarket accessory 130, or non-authentic accessory 140.

After initiating the accessory, device 110 attempts to verify that the accessory and the device are paired (506). If the accessory and the device are paired (508, yes), then device 110 enables normal operation of the accessory (510). In this case where the accessory and the device are paired (508, yes), then the accessory initiated at step 504 is the original accessory (e.g. original accessory 120) paired at step 502.

If the accessory and the device are not paired (508, no), then device 110 attempts to perform a second authentication process (512). If the accessory passes the second authentication process (514, yes), then device 110 enables normal operation of the accessory. In this case where the accessory is not paired with device 110 but passes the second authentication test, the accessory is an authorized, aftermarket accessory (e.g. aftermarket accessory 130).

If the accessory and the device are not paired (508, no) and if the accessory does not pass the second authentication process (514, no), then device 110 restricts operation of the accessory (516). In this case where the accessory is not paired with device 110 and does not pass the second authentication test, the accessory is a non-authentic accessory (e.g. non-authentic accessory 140).

Figure 6:
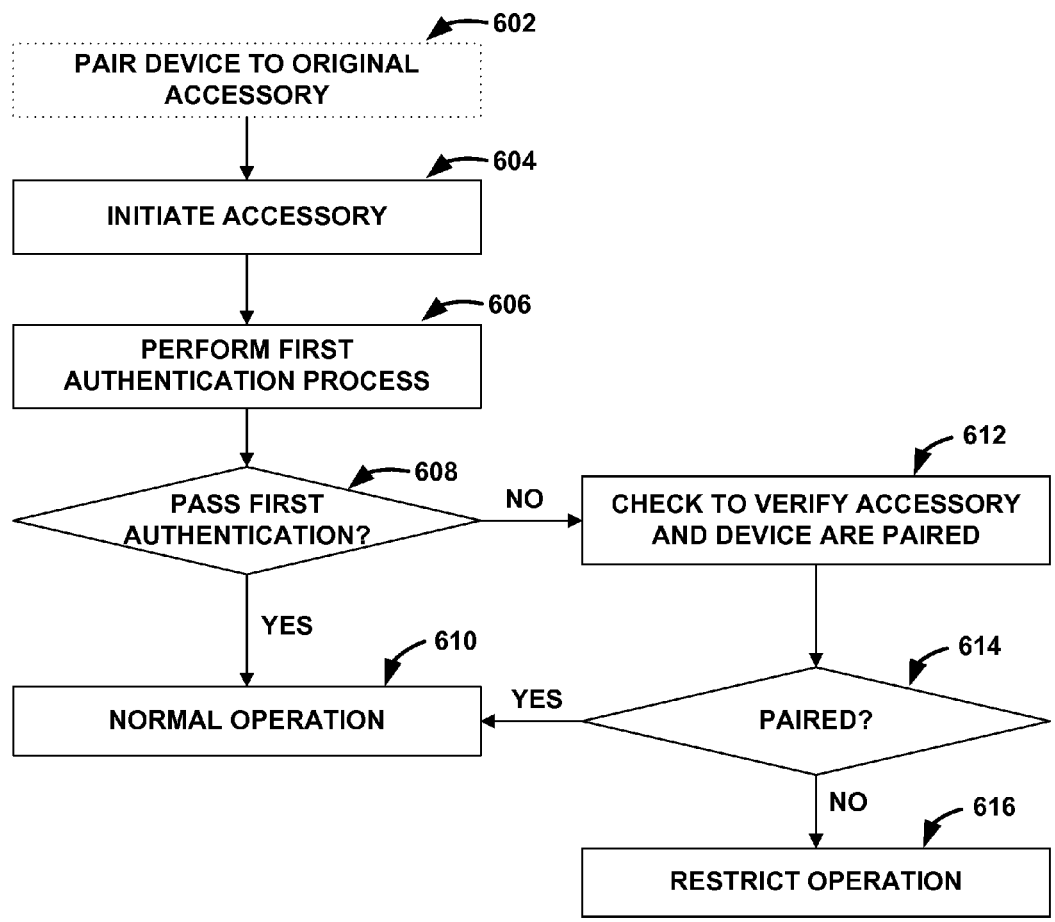
FIG. 6 is a flowchart illustrating an example process by which a device may authenticate an accessory according to the techniques of this disclosure.

FIG. 6 is a flowchart illustrating the process by which a device may authenticate an accessory according to the techniques of this disclosure. The techniques of FIG. 6 will be described with respect to device 110, original accessory 120, aftermarket accessory 130, and non-authentic accessory 140, although the techniques of FIG. 6 are not limited to any particular type of device. FIG. 6 differs from FIG. 5 in that in FIG. 5 the second authentication process is performed in response to device 110 and the accessory not being paired, whereas in FIG. 6, the authentication process is performed first, and the checking of the pairing is performed in response to the accessory not passing the authentication process. It is contemplated that device 110 may implement either or both of the techniques of FIGS. 5 and 6.

In the example of FIG. 6, device 110 is paired to original accessory 120 (602). As explained above, this pairing may be performed prior to device 110 and original accessory 120 being acquired by an end user. Device 110 may initiate an accessory (604). Device 110 may, for example, initiate the accessory upon boot up, upon the accessory being attached to device 110, or in response to some other event. Step 602 is shown in FIG. 6 with a dotted line to signify that it may, in some examples, only be performed one time. For example, pairing device 110 to original accessory 120 (e.g. step 602) may be performed once by an OEM or retailer, whereas initiating the accessory (e.g. step 604) may be performed many times. Step 604 may, for example, be performed every time device 110 is booted or restarted or every time an accessory is attached to device 110. As will be made clear in the following description, the accessory paired with device 110 in step 602 is original accessory 120, while the accessory initiated at step 604 may be any of original accessory 120, aftermarket accessory 130, or non-authentic accessory 140.

After initiating the accessory, device 110 performs a first authentication process on the accessory (606). If the accessory passes the first authentication process (608, yes), then device 110 enables normal operation of the accessory. In this case, where the accessory passes the authentication process, the accessory is an authentic accessory.

If the accessory does not pass the authentication process (608, no), then device 110 may check to verify that the accessory is paired to device 110 (612). If the accessory is paired to device 110 (614, yes), then device 110 enables normal operation of the accessory (610). In this case where the accessory and the device are paired (614, yes), then the accessory initiated at step 604 is the original accessory (e.g. original accessory 120) paired at step 602.

If the accessory does not pass the authentication process (608, no) and if the accessory and the device are not paired (614, no), then device 110 restricts operation of the accessory (616). In this case where the accessory is not paired with device 110 and does not pass the authentication test, the accessory is a non-authentic accessory (e.g. non-authentic accessory 140).

Figure 7:
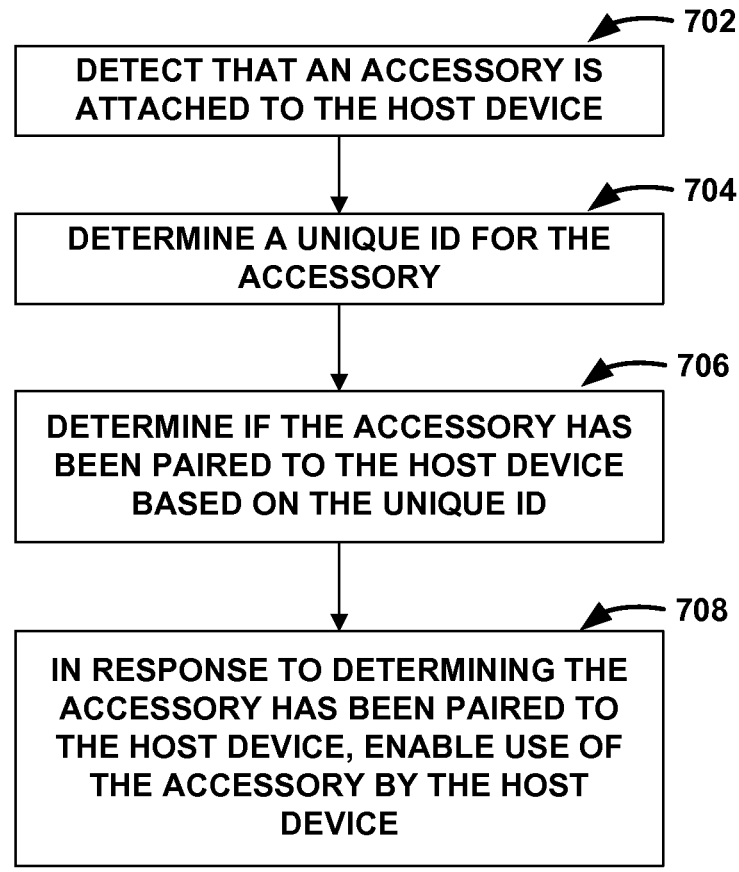
FIG. 7 is a flowchart illustrating an example process by which a device may authenticate an accessory according to the techniques of this disclosure.

FIG. 7 is a flowchart illustrating the process by which a device may authenticate an accessory according to the techniques of this disclosure. The techniques of FIG. 7 will be described with respect to device 110 and original accessory 120, although the techniques of FIG. 7 are not limited to any particular type of device. In the example of FIG. 6, device 110 detects that an accessory is attached to the device 110 (702). Device 110 determines a unique ID for the accessory (704). Device 110 determines if the accessory has been paired to the device 110 based on the unique ID (706). In response to determining that the accessory has been paired to device 110, device 110 enables use of the accessory by device 110 (708). In this example, enabling use may mean allowing a battery to charge or to power device 110, allowing a power supply to supply power, allowing an input device to provide input to device 110, or permitting the accessory to perform any such type of function.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of authenticating a peripheral device, the method comprising:

in a configuration mode inaccessible to an end user of a device, pairing a first accessory to the device by storing a copy of a unique ID for the first accessory on the device;
at the device, detecting that the first accessory is attached to the device;
determining the unique ID for the first accessory;
at the device, determining if the first accessory has been paired to the device based on the unique ID;
in response to determining the first accessory has been paired to the device, enabling use of the first accessory by the device;
at the device, detecting that a second accessory is attached to the device;
at the device, determining if the second accessory has been paired to the device;
in response to determining the second accessory has not been paired to the device, performing a secondary authentication process on the second accessory; and
in response to determining the second accessory has not been paired to the device and the second accessory passing the secondary authentication process, enabling use of the secondary accessory by the device, wherein the secondary authentication process utilizes cryptographic authentication hardware on the second accessory, and wherein the first accessory does not include cryptographic authentication hardware.

2. The method of claim 1, wherein determining if the first accessory has been paired to the device comprises determining if the unique ID for the first accessory, or a value based on the unique ID for the first accessory, matches a value determined by the device.

3. The method of claim 1, wherein the secondary authentication process comprises reading an authentication chip of the second accessory.

4. The method of claim 1, further comprising:
in response to determining the first accessory has not been paired to the device, performing the secondary authentication process on the first accessory;
in response to determining the first accessory has not been paired to the device and the authentication process not authenticating the first accessory, preventing use of the first accessory by the device.

5. The method of claim 1, wherein determining if the first accessory has been paired to the device is performed in response to the first accessory failing a first authentication check.

6. The method of claim 1, wherein the unique ID comprises a product identification number.

7. A device comprising:
one or more memories;
one or more processors configured to:
in a configuration mode inaccessible to an end user of the device, pairing a first accessory to the device by storing a copy of a unique ID for the first accessory on the device;
detect that the first accessory is attached to the device;
determine the unique ID for the first accessory;
determine, based on the unique ID, if the first accessory has been paired to the device;
in response to determining that the first accessory has been paired to the device, enable use of the first accessory by the device;
detect that a second accessory is attached to the device;
determine if the second accessory has been paired to the device;

in response to determining the second accessory has not been paired to the device, perform a secondary authentication process on the second accessory; and in response to determining the second accessory has not been paired to the device and the second accessory pass the secondary authentication process, enable use of the secondary accessory by the device, wherein the secondary authentication process utilizes cryptographic authentication hardware on the second accessory, and wherein the first accessory does not include cryptographic authentication hardware.

8. The device of claim 7, wherein the one or more processors are configured to determine if the first accessory has been paired to the device by determining if the unique ID for the first accessory, or a value based on the unique ID for the first accessory, matches a value determined by the device.

9. The device of claim 7, wherein the secondary authentication process comprises reading an authentication chip of the second accessory.

10. The device of claim 7, wherein the one or more processors are configured to:
in response to determining the first accessory has not been paired to the device, perform a secondary authentication process on the first accessory;
in response to determining the first accessory has not been paired to the device and the authentication process not authenticating the first accessory, prevent use of the accessory by the device.

11. The device of claim 7, wherein the one or more processors are configured to determine if the first accessory has been paired to the device in response to the first accessory failing a first authentication check.

12. The device of claim 7, wherein the unique ID comprises a product identification number.

13. A non-transitory computer-readable storage medium storing instructions that when executed by one or more processors cause the one or more processors to:
in a configuration mode inaccessible to an end user of a device, pair a first accessory to the device by storing a copy of a unique ID for the first accessory on the device;
detect that a first accessory is attached to the device;
determine the unique ID for the first accessory;
determining if the first accessory has been paired to the device based on the unique ID;
in response to determining the first accessory has been paired to the device, enable use of the first accessory by the device;
detect that a second accessory is attached to the device;
determine if the second accessory has been paired to the device;
in response to determining the second accessory has not been paired to the device, perform a secondary authentication process on the second accessory; and
in response to determining the second accessory has not been paired to the device and the second accessory passing the secondary authentication process, enable use of the secondary accessory by the device, wherein the secondary authentication process utilizes cryptographic authentication hardware on the second accessory, and wherein the first accessory does not include cryptographic authentication hardware.

14. The non-transitory computer-readable storage medium of claim 13, wherein the one or more processors determine if the first accessory has been paired to the device by determining if the unique ID for the first accessory, or a value based on the unique ID for the first accessory, matches a value determined by the device.

15. The non-transitory computer-readable storage medium of claim 13, wherein the secondary authentication process comprises reading an authentication chip of the second accessory.

16. The non-transitory computer-readable storage medium of claim 13 storing further instructions that when executed by the one or more processors cause the one or more processors to:
in response to determining the first accessory has not been paired to the device, perform a secondary authentication process on the first accessory;
in response to determining the first accessory has not been paired to the device and the secondary authentication process not authenticating the first accessory, prevent use of the first accessory by the device.

17. The non-transitory computer-readable storage medium of claim 13, wherein the one or more processors determine if the first accessory has been paired to the device in response to the first accessory failing a first authentication check.

* * * * *